US010811649B2

(12) United States Patent
Zacher et al.

(10) Patent No.: US 10,811,649 B2
(45) Date of Patent: Oct. 20, 2020

(54) TRACTION BATTERY OF A MOTOR VEHICLE

(71) Applicants: Dr. Ing. h.c. F. Porsche Aktiengesellschaft, Stuttgart (DE); Audi AG, Ingolstadt (DE)

(72) Inventors: Marcus Zacher, Sindelfingen (DE); Juergen Gerbrand, Kirchberg an der Murr (DE); Thomas Milde, Wuestenrot (DE); Martin Schuessler, Koesching (DE)

(73) Assignees: Dr. Ing. h.c. F. Porsche Aktiengesellschaft (DE); Audi AG (DE)

( * ) Notice: Subject to any disclaimer, the term of this patent is extended or adjusted under 35 U.S.C. 154(b) by 0 days.

(21) Appl. No.: 16/456,090

(22) Filed: Jun. 28, 2019

(65) Prior Publication Data

US 2020/0006730 A1   Jan. 2, 2020

(30) Foreign Application Priority Data

Jul. 2, 2018   (DE) .................. 10 2018 115 919

(51) Int. Cl.
| | |
|---|---|
| *B60K 1/04* | (2019.01) |
| *H01M 2/10* | (2006.01) |
| *H01M 10/625* | (2014.01) |
| *H01M 10/6556* | (2014.01) |
| *H01M 10/613* | (2014.01) |

(52) U.S. Cl.
CPC ............ *H01M 2/1083* (2013.01); *B60K 1/04* (2013.01); *H01M 2/1077* (2013.01); *H01M 10/613* (2015.04); *H01M 10/625* (2015.04); *H01M 10/6556* (2015.04); *B60K 2001/0438* (2013.01); *H01M 2220/20* (2013.01)

(58) Field of Classification Search
CPC ............ B60K 1/04; B60K 2001/0438; H01M 2/1083; H01M 2/1077; H01M 10/613; H01M 10/625; H01M 10/6556; H01M 2220/20
USPC ....................................... 180/68.5
See application file for complete search history.

(56) References Cited

U.S. PATENT DOCUMENTS

| | | | |
|---|---|---|---|
| 9,112,208 B2 | 8/2015 | Kohlberger et al. | |
| 9,876,207 B2 * | 1/2018 | Tokoo ..................... | H01M 2/14 |

(Continued)

FOREIGN PATENT DOCUMENTS

| | | |
|---|---|---|
| DE | 102009040197 A1 | 3/2011 |
| DE | 102015224777 A1 | 6/2017 |

(Continued)

*Primary Examiner* — John D Walters
(74) *Attorney, Agent, or Firm* — RatnerPrestia (57) ABSTRACT

Traction battery of a motor vehicle includes a battery frame which is assembled from supports. A plurality of battery modules are accommodated in the battery frame and are each composed of a plurality of battery cells which are accommodated in a module housing of the respective battery module. The respective module housing is assembled from side walls and a base wall. The base wall of the respective module housing is designed as a cooling panel for cooling the battery cells. A cover panel is connected to is the battery frame. An underride guard panel is connected to the battery frame.

9 Claims, 5 Drawing Sheets

(56) References Cited

U.S. PATENT DOCUMENTS

| | | | | |
|---|---|---|---|---|
| 2004/0096715 | A1* | 5/2004 | Herdtle | H01M 8/248 |
| | | | | 429/435 |
| 2018/0062226 | A1* | 3/2018 | Raiser | H01M 2/1077 |
| 2018/0123197 | A1* | 5/2018 | Liptak | H01M 10/615 |
| 2018/0215282 | A1 | 8/2018 | Pohl et al. | |
| 2019/0074497 | A1 | 3/2019 | Haeusler et al. | |

FOREIGN PATENT DOCUMENTS

| | | |
|---|---|---|
| DE | 102016222550 A1 | 5/2018 |
| DE | 102016125697 A1 | 6/2018 |
| DE | 102017103654 A1 | 8/2018 |
| DE | 102018215036 A1 | 3/2019 |
| WO | 2018071758 A1 | 4/2018 |
| WO | 2018149762 A1 | 8/2018 |
| WO | 102017005314 A1 | 12/2018 |

\* cited by examiner

TRACTION BATTERY OF A MOTOR VEHICLE

CROSS-REFERENCE TO RELATED APPLICATION

This application claims priority to German Patent Application No. 10 2018 115 919.6, filed Jul. 2, 2018, the content of such application being incorporated by reference herein in its entirety.

FIELD OF THE INVENTION

The invention relates to a traction battery of a motor vehicle.

BACKGROUND OF THE INVENTION

DE 10 2015 224 777 A1, which are incorporated by reference herein, discloses a battery housing for a traction battery of a motor vehicle. The battery housing has a battery lower part with a housing base and also an encircling wall which rises from said housing base. Reinforcing struts extend in a housing interior. The reinforcing struts delimit, together with the housing side walls, module receptacles into each of which a battery module can be inserted. A housing cover of the battery housing adjoins the top of the housing lower part.

Traction batteries known from the prior art have a relatively complex construction, wherein cooling of the battery modules creates problems and furthermore the traction battery is protected only to an insufficient extent against damage when driving over obstacles.

SUMMARY OF THE INVENTION

Described herein is a traction battery of a motor vehicle, which traction battery has a relatively simple construction, allows reliable cooling of the battery modules and protects against damage when driving over obstacles.

The traction battery according to aspects of the invention comprises a battery frame which is assembled from supports. The support is encircling and preferably composed of only two longitudinal supports and two lateral supports.

The traction battery according to aspects of the invention further comprises a plurality of battery modules which are accommodated in the battery frame and are each composed of a plurality of battery cells which are accommodated in a module housing, wherein the respective module housing is assembled from side walls and a base wall, and wherein the base wall of the respective module housing is designed as a cooling panel for cooling the battery cells of the respective battery module.

The traction battery according to aspects of the invention further comprises a cover panel which is connected to the battery frame, and an underride guard panel which is connected to the battery frame.

Therefore, the traction battery according to aspects of the invention comprises the battery frame which is assembled from preferably four supports. The supports of the battery frame are preferably welded to one another. The battery modules are accommodated in the frame. Each battery module has a respective module housing which, just like the battery frame, is assembled from assemblies, specifically from a base wall and also from preferably four side walls. The base wall and the side walls of the respective module housing are preferably screw-connected to one another. The module housings are connected, preferably screw-connected, to the battery frame. The base wall of the respective module housing serves as a cooling panel for cooling the battery cells of the respective battery module. The cover wall and the underride guard panel are connected, preferably screw-connected, to the battery frame. The traction battery according to aspects of the invention has a simple structure, allows advantageous cooling of the battery cells and is protected against damage when driving over obstacles.

According to one advantageous development of the invention, the base wall of the respective module housing protrudes in relation to the side walls of the respective module housing on two opposite narrow sides and there has, on a first side, a feed connection and, on an opposite second side, a return connection for coolant. The base wall of the respective module housing can, given a simple construction of the traction battery, be effectively supplied with coolant from a narrow side, and furthermore coolant can be discharged in a simple manner from the base wall on an opposite narrow side of the respective module housing. The battery cells of the respective battery module which are situated on the base wall of the respective module housing can be effectively cooled given a simple construction of the traction battery.

According to one advantageous development of the invention, the battery modules are accommodated in the battery frame in such a way that the narrow sides of the module housings of the battery modules are in alignment and therefore the feed connections and the return connections are respectively in a row, wherein a support of the battery frame, which support runs parallel in relation to the row of feed connections, forms a feed channel which is coupled to the feed connections, whereas an opposite support of the battery frame, which opposite support runs parallel in relation to the row of return connections, forms a return channel which is coupled to the return connections. The feed connections and the return connections, which are formed on the base wall of the respective module housing of the respective battery module, can be incorporated into a cooling circuit in a simple manner via the feed channel and the return channel which is provided by the battery frame in each case.

According to one advantageous development, spring-elastically deformable elements are positioned between the base walls of the battery modules and the underride guard panel. A first section of the respective spring-elastically deformable element is preferably connected to the base wall of at least one battery module and/or to at least one support of the battery frame. Second sections of the respective spring-elastically deformable element bear loosely against the underride guard panel. The traction battery can be particularly effectively protected against damage when driving over obstacles by way of these spring-elastically deformable elements. The spring-elastically deformable elements cushion a movement of the underride guard panel relative to the base walls of the module housings of the battery modules. Although the spring-elastically deformable elements are particularly preferably used in combination with the other details of the invention above, the use of said spring-elastically deformable elements is not limited so thereto. The spring-elastically deformable elements can also be used in battery frames and battery modules of different construction. Also described is a corresponding traction battery.

BRIEF DESCRIPTION OF THE DRAWING

Preferred developments of the invention can be found in the following description. Exemplary embodiments of the invention will be explained in more detail with reference to the drawing, without being restricted thereto. In the drawing.

DETAILED DESCRIPTION OF THE INVENTION

Figure 1:
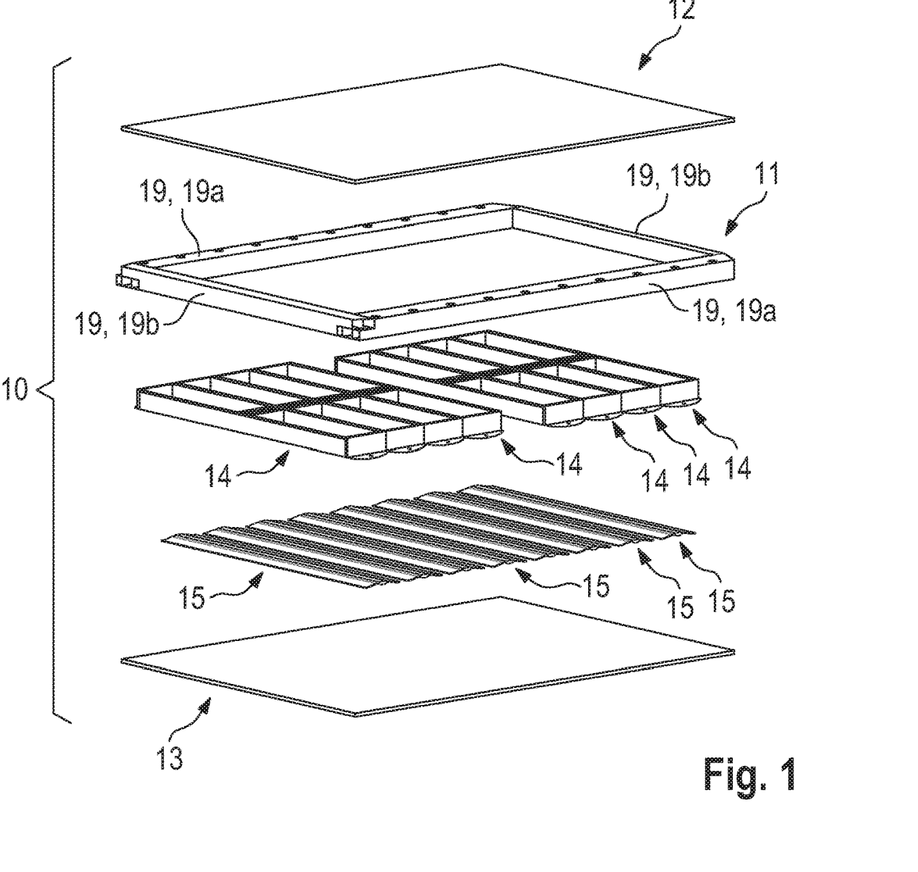
FIG. 1 shows an exploded illustration of a traction battery according to aspects of the invention without battery cells.

FIG. 1 shows an exploded illustration of selected assemblies of a traction battery 10 according to aspects of the invention. For instance, FIG. 1 shows a battery frame 11, a cover panel 12 which can be connected to the battery frame 11, an underride guard panel 13 which can likewise be connected to the battery frame 11, module housings 14 of battery modules which are to be placed in the battery frame 11, and also spring-elastically deformable elements 15 which, in the assembled state of the traction battery 10, are arranged between the battery modules, specifically the module housings 14 of said battery modules, and the underride guard panel 13. FIG. 1 shows a total of eight so module housings 14 for accordingly eight battery modules, and also eight spring-elastically deformable elements 15. However this number is purely exemplary.

Figure 3:
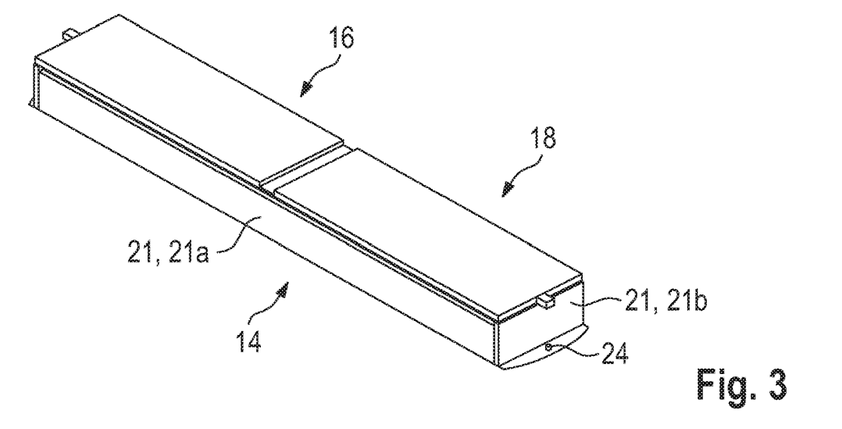
FIG. 3 shows a battery module of the traction battery on its own.
Figure 4:
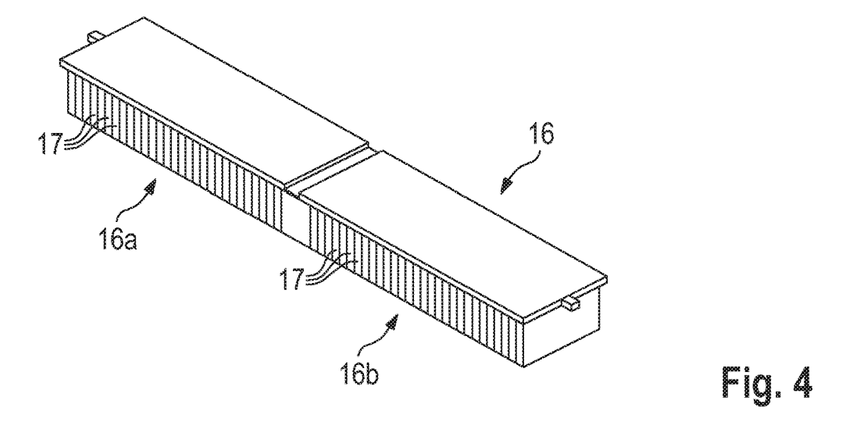
FIG. 4 shows battery cells of the battery module of FIG. 3.
Figure 5:
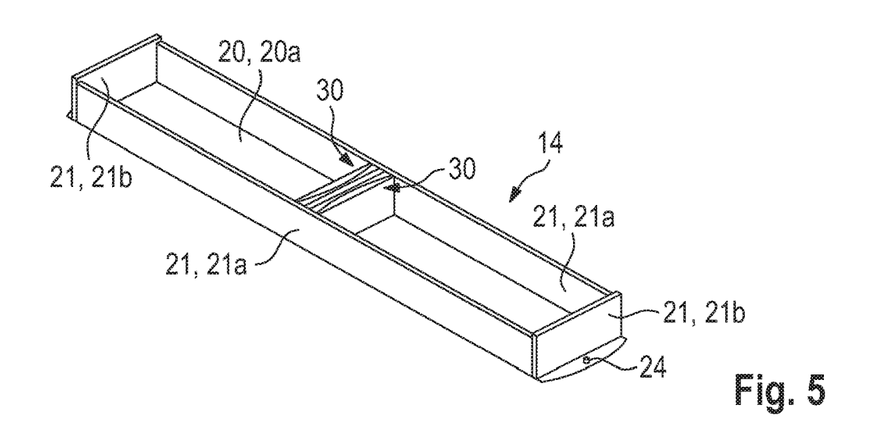
FIG. 5 shows a module housing of the battery module of FIG. 3.

FIG. 1 shows only the module housings 14 of the battery modules. FIG. 5 likewise shows a module housing 14, but in greater detail than in FIG. 1. FIG. 4 shows a unit 16 comprising a plurality of battery cells 17 of a battery module which are to be positioned in the module housing 14. FIG. 3 shows a complete battery module 18 which consists of the module housing 14 and of unit 16 with the plurality of battery cells 17. Depending on the desired electrical capacitance, the battery cells 17 of a battery module 18 are interconnected in parallel and/or in series.

Figure 2:
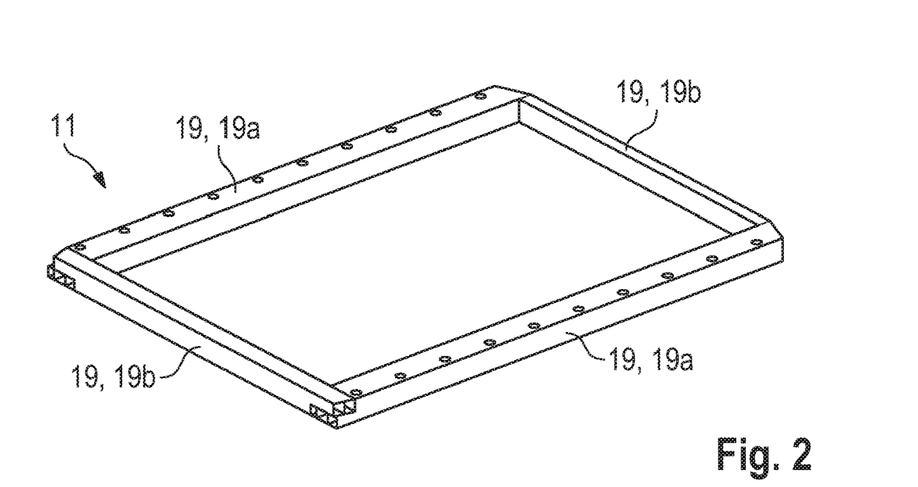
FIG. 2 shows a battery frame of the traction battery on its own.

The battery frame 11 of the traction battery 10 according to aspects of the invention is assembled from supports 19, specifically from two longitudinal supports 19a and also from two lateral supports 19b. The two longitudinal supports 19a of the battery frame 11 extend in parallel and at a distance from one another, wherein the two lateral supports 19b of the battery frame 11 extend between the ends of the two longitudinal supports 19a perpendicularly in relation to the two longitudinal supports 19a and are connected to the longitudinal supports 19a at mutually adjacent ends, preferably by welding. Therefore, an encircling battery frame 11 is formed. The battery frame 11 consists only of these supports 19a, 19b. The supports 19 are preferably hollow and reinforced by means of a framework structure (see FIG. 8).

The welding of the supports 19a of the battery frame 11 to the supports 19b of the battery frame 11 is preferred for the purpose of sealing off the battery frame 11 of the traction battery according to aspects of the invention by means of the corresponding weld seams between the supports 19a, 19b of the battery frame 11.

Each module housing 14 of the respective battery module 18 has a base wall 20 and also a plurality of side walls 21. The module housing 14 is designed as a constructed assembly, just like the battery frame 11; the side walls 21 are accordingly fitted and therefore assembled together with the base wall to form an assembly. Therefore, it is possible to screw-connect or to weld the side walls 21 of the respective module housing 14 to the respective base wall 20. The mutually adjacent ends of the side walls 21 are preferably screw-connected to one another. The side walls 21 are preferably manufactured from solid material in order to increase the stability.

It can be seen in FIG. 5 that two opposite first side walls 21a of the respective module housing 14 of the respective battery module 18 form longitudinal sides of the respective module housing 14 and two opposite second side walls 21b form narrow sides of the respective module housing 14. According to FIG. 7, the side walls 21b are screw-connected to the side walls 21a.

In the exemplary embodiment of FIG. 5 shown, the interior of the respective module housing 14, which interior is defined by the side walls 21, is split into compartments by middle walls 30. The middle walls 30 run parallel in relation to the side walls 21b of the respective module housing 14 which define the narrow sides. In the exemplary embodiment shown, the unit 16 comprising the battery cells 17 is subdivided into two subunits 16a, 16b comprising a plurality of battery cells 17 in each case. These two subunits 16a, 16b are arranged in the compartments of the module housing and are separated from one another by the middle walls 30. The two subunits 16a, 16b are electrically isolated, preferably DC-isolated. A battery cell controller, not shown, is preferably arranged in a compartment which is defined between the two middle walls 30.

The side walls 21a, 21b and middle walls 30 serve, in particular, to absorb so-called swelling forces as forces which are caused by a change in volume of the battery modules 18. A change in volume of this kind can be formed during charging and discharging of the battery modules 18.

Figure 7:
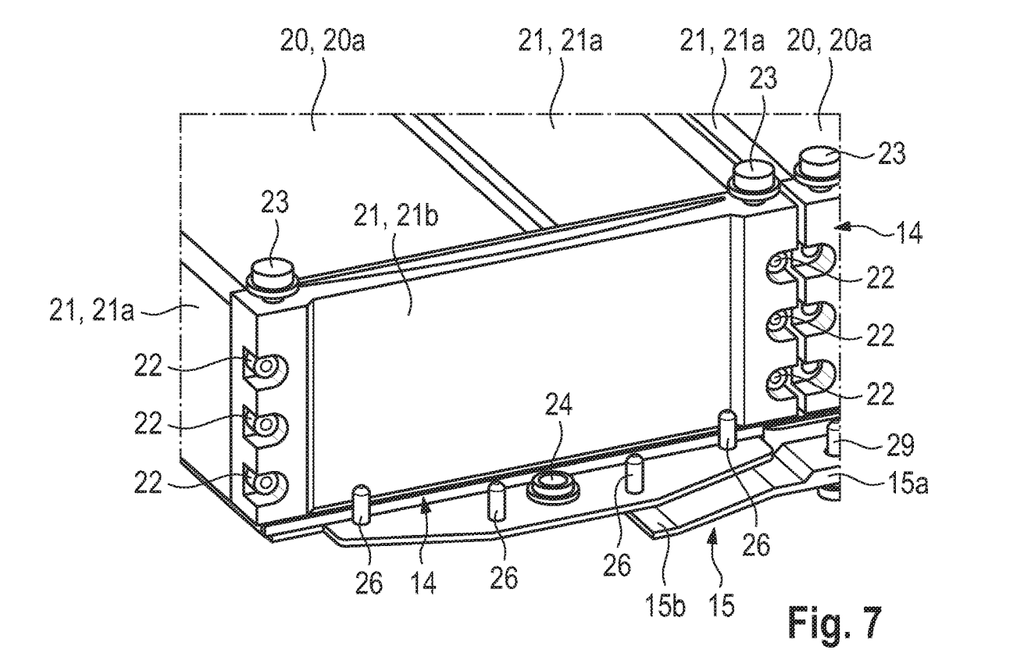
FIG. 7 shows a further detail of the traction battery.

FIG. 7 shows the connection of the side walls 21a, 21b of the module housings 14 of the battery modules 18 by means of screws 22.

Furthermore, FIG. 7 shows screws 23 by means of which the respective longitudinal support 19a can be fastened to the module housings 14 of the battery modules 18, specifically to those side walls 21b of the module housings 14 of the battery modules 18 that define the narrow sides. Also see FIG. 8.

Figure 6:
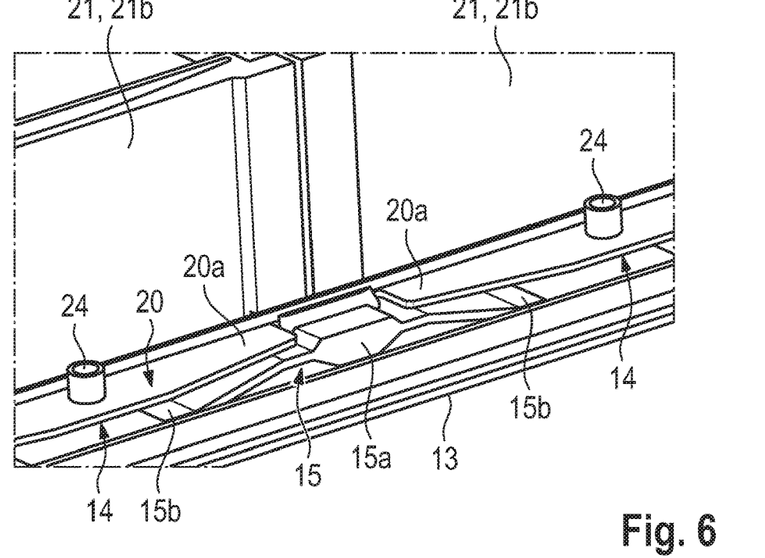
FIG. 6 shows a detail of the traction battery.

As can be seen most clearly in FIGS. 5, 6 and 7, the base wall 20 of the respective module housing 14 protrudes in relation to the side walls 21b of the module housing 14, which side walls define the narrow sides, on opposite narrow sides of the respective module housing 14, wherein a feed connection 24 is formed on a first narrow side and a return connection, not visible in the figures, for coolant is formed on an opposite narrow side.

The base wall 20 of the respective module housing 14 is accordingly designed as a cooling panel for cooling the battery cells 17, wherein the base wall 20 can be supplied with coolant via the respective feed connection 24, and wherein coolant can be discharged from the respective base wall 20 via the respective return connection (not shown).

Figure 10:
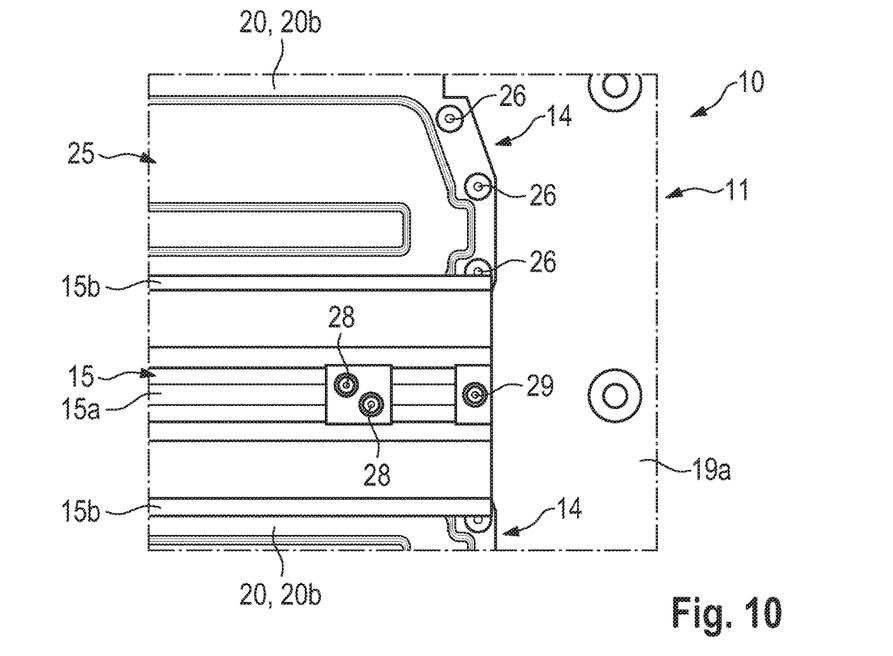
FIG. 10 shows a further detail of the traction battery.
Figure 11:
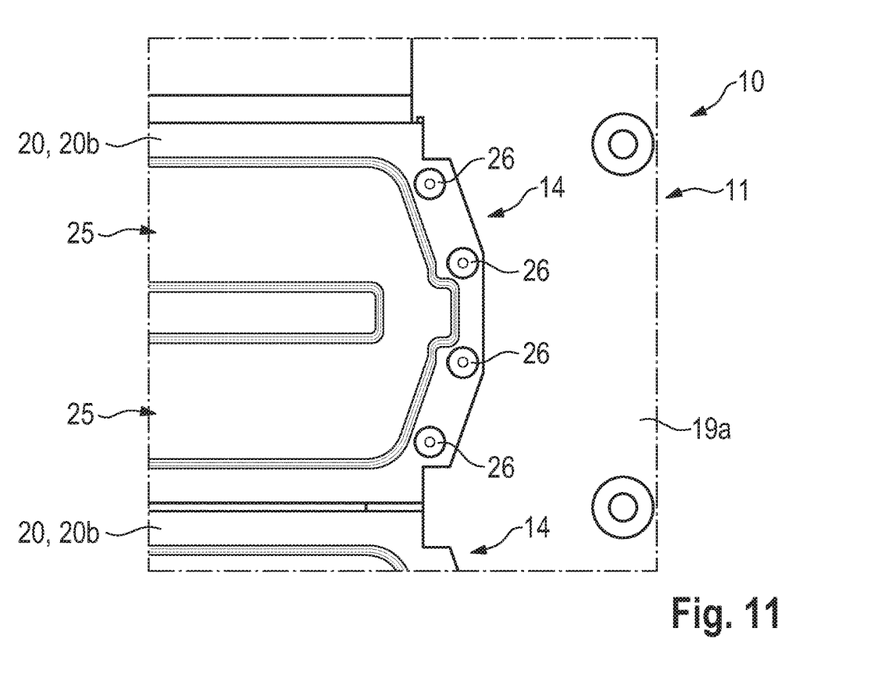
FIG. 11 shows a further detail of the traction battery.

FIGS. 10 and 11 show a view of a traction battery 10 according to aspects of the invention, specifically of the base walls 20 of module housings 14 of the battery modules 18, from below. In this case, it can be seen in FIGS. 10 and 11 that the base wall 20 of the respective module housing 14, which base wall serves as a cooling panel, has or forms a cooling channel 25 for coolant, which cooling channel extends, starting from the feed connection 24, in the direction of the return connection 25, that is to say, starting from a first narrow side, in the direction of an opposite second narrow side of the respective module housing 14.

FIGS. 7, 10 and 11 show connecting screws 26 by means of which the base walls 20 of the module housings 14, by way of sections by way of which said base walls protrude in relation to the corresponding side walls 21b of the module housings 14 at the narrow sides, can be fitted to the battery frame 11, specifically to the longitudinal supports 19a of the battery frame 11.

As already stated above, the base walls 20 of the module housings 14 are designed as cooling panels, wherein they have a feed connection 24 and a return connection in the region of the narrow sides in order to firstly supply coolant to the respective base wall 20 and secondly to discharge coolant from said base wall. Each battery module 18 is individually cooled by means of its base wall 20.

Figure 8:
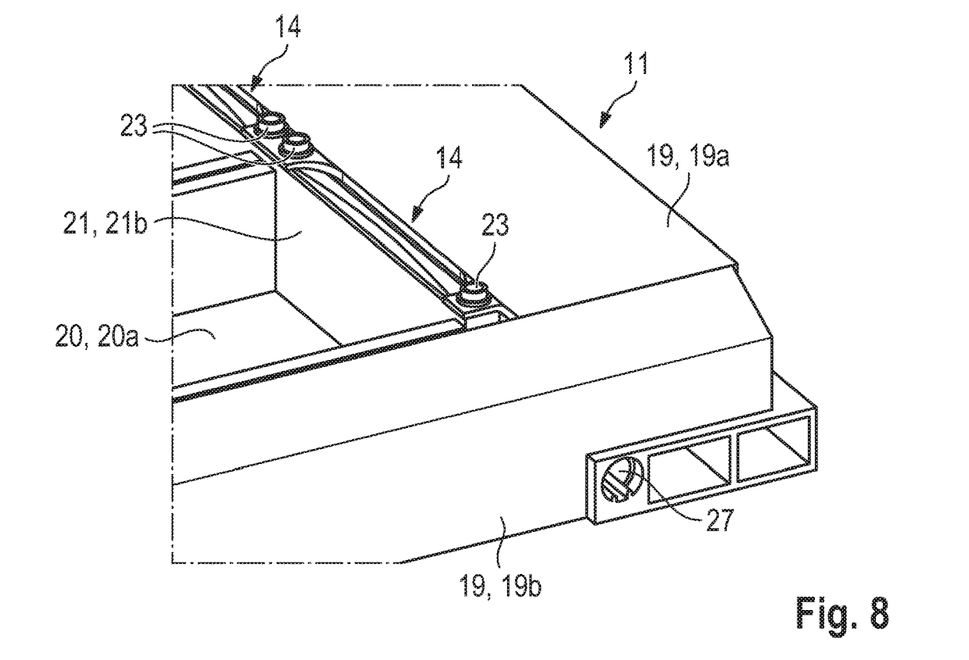
FIG. 8 shows a further detail of the traction battery.

The battery modules 18 or the module housings 14 thereof are accommodated, as can be seen in FIG. 1 in particular, in the battery frame 11 in such a way that the narrow sides or the side walls 21b of the module housings 14 of the battery modules 18, which side walls define the narrow sides, are in alignment, so that the feed connections 24 on a first narrow side and the return connections on the opposite narrow side are also respectively in a row. In this case, longitudinal supports 19a, which extend parallel in relation to the row of feed connections 24 and also parallel in relation to the row of return connections, provide a feed channel 27 and also a return channel, not shown in the figures. For instance, FIG. 8 shows a feed channel 27 for coolant, which feed channel is formed by the longitudinal support 19a of the battery frame 11 visible in said figure, it being possible for the feed connections 24 of the base walls 20 of the module housings 14 to be supplied with coolant by means of said feed channel.

Figure 9:
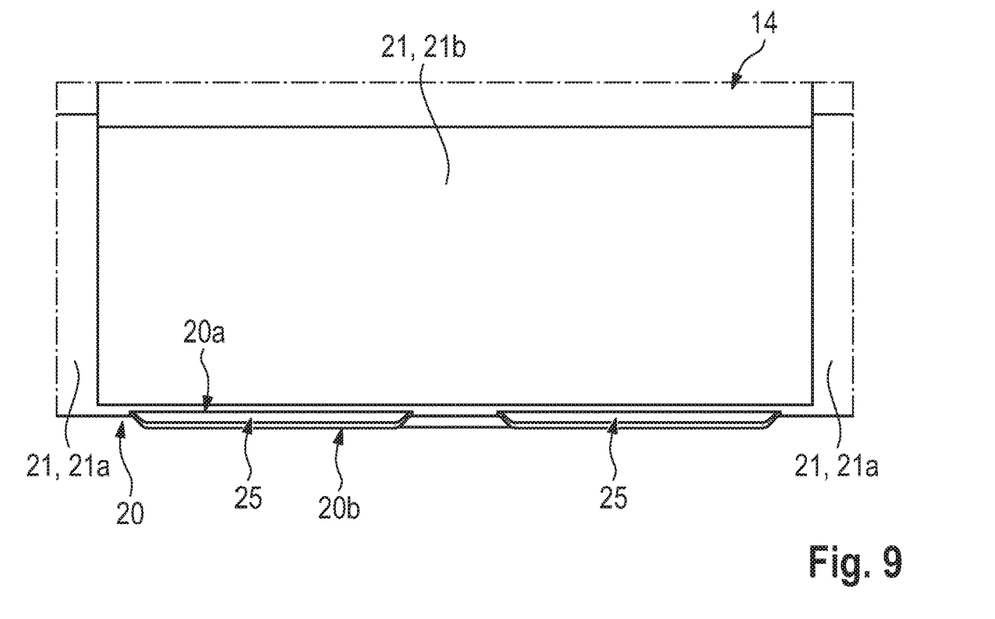
FIG. 9 shows a further detail of the traction battery.

It can be seen in FIG. 9 that the base wall 20 of the respective module housing 14 has a top panel 20a and a bottom panel 20b. The top panel 20a and the bottom panel 20b, in first sections, bear against one another and are connected to one another there. In second sections, the top panel 20a and the bottom panel 20b are at a distance from one another and define the cooling channels 25 through which the coolant can be guided, starting from the feed connection 24, in the direction of the return connection.

As already stated above, the side walls 21a, 21b of each module housing 14 of each battery module 18 are connected to one another, preferably screw-connected to one another. The screws 22 are visible in FIG. 7.

Similarly, the base wall 20 of the respective module housing 14 is connected to the side walls 21a, 21b, preferably screw-connected thereto. Furthermore, the base wall 20 of the respective module housing 14 is screw-connected to the supports 19a of the battery frame 11 by means of the screws 26.

Furthermore, the supports 19a of the battery frame are screw-connected to the side walls 21b of the module housing 14 by means of the screws 23.

Furthermore, the cover panel 12 is screw-connected to the battery frame 11, just like the underride guard panel 13 is screw-connected to the battery frame 11.

Spring-elastically deformable elements 15 are arranged between the base walls 20 of the module housings 14 of the battery modules 18 and the underride guard panel 13. FIGS. 6, 7 and 10 show the installation position of these spring-elastically deformable elements 15.

As already stated, the battery modules 18 are accommodated in the battery frame 11 in such a way that the narrow sides or the side walls 21b of the module housings 14, which side walls define the narrow sides, are in alignment. Accordingly, the side walls 21a of the module housings 14, which side walls define the longitudinal sides of the module housing 14, run parallel in relation to one another, wherein the side walls 21a of adjacent battery modules 18 or adjacent module housings 14 are adjacent to one another. The spring-elastically deformable elements 15 extend in the direction of these side walls 21a of the module housings and therefore in the direction of the longitudinal sides of the module housings 14, wherein the spring-elastically deformable elements 15 extend over the entire longitudinal extent of the module housings 14.

Each spring-elastically deformable element 15, which preferably has a trapezoidal contour, has a first section 15a on which two adjacent battery modules or two adjacent module housings 14 with immediately adjacent side walls 21a bear, wherein these spring-elastically deformable elements 15, in the region of this first section 15a, are connected to the base wall 20 of the respective module housings 14 or to the side walls 21a of the respective module housings 14 by means of first screws 28, and wherein second screws 29 serve to fasten the spring-elastically deformable elements 15, by way of their respective first section 15a, to the battery frame 11, specifically to the supports 19a of the battery frame 11. The spring-elastically deformable elements 15 bear loosely against the underride guard panel 13 by way of second sections 15b. When a motor vehicle which comprises the traction battery 10 drives over an obstacle and the underride guard panel 13 touches this obstacle, the underride guard panel 13 moves upward, wherein the spring-elastically deformable elements 15 cushion this upward movement of the underride guard panel 13 in the direction of the battery modules 18 and in so doing prevent the module housings 14 of the battery modules 18 from being damaged. The sections 15a, 15b of the respective spring-elastically deformable element 15 preferably extend over the entire longitudinal extent of the module housings 14.

What is claimed is:

1. A traction battery of a motor vehicle, said traction battery comprising:
   a battery frame comprising supports,
   a plurality of battery modules accommodated in the battery frame, wherein each battery module is composed of a plurality of battery cells which are accommodated in a module housing of the respective battery module,
   each module housing comprises side walls and a base wall, the base wall of each module housing is configured as a cooling panel for cooling the battery cells,
   a cover panel which is connected to the battery frame, and
   an underride guard panel which is connected to the battery frame,
   wherein the base wall of each module housing protrudes in relation to the side walls of the respective module housing on two opposite narrow sides and has, on a first side, a feed connection, and, on an opposite second side, a return connection for coolant, and
   wherein the battery modules are accommodated in the battery frame in such a way that the narrow sides of the module housings of the battery modules are in alignment and the feed connections and the return connections are respectively in a row.

2. The traction battery as claimed in claim 1, wherein a support of the battery frame, which support runs parallel in relation to the row of feed connections, forms a feed channel which is coupled to the feed connections, whereas an opposite support of the battery frame, which opposite support runs parallel in relation to the row of return connections, forms a return channel which is coupled to the return connections.

3. The traction battery as claimed in claim 1, wherein the base wall of the respective module housing has a top panel and a bottom panel,
  wherein the top panel and the bottom panel, in first sections, bear against one another and are connected to one another, and wherein the top panel and the bottom panel, in second sections, are disposed at a distance from one another and form cooling channels.

4. The traction battery as claimed in claim 1, wherein
  the side walls of the respective module housing are screw-connected to one another,
  the base wall of the respective module housing is screw-connected to the side walls of the respective module housing,
  the base wall and side walls of the respective module housing are screw-connected to supports of the battery frame,
  the cover panel is screw-connected to the battery frame, and
  the underride guard panel is screw-connected to the battery frame.

5. A traction battery of a motor vehicle, said traction battery comprising:
  a battery frame comprising supports,
  a plurality of battery modules accommodated in the battery frame, wherein each battery module is composed of a plurality of battery cells which are accommodated in a module housing of the respective battery module,
  each module housing comprises side walls and a base wall, the base wall of each module housing is configured as a cooling panel for cooling the battery cells,
  a cover panel which is connected to the battery frame,
  an underride guard panel which is connected to the battery frame, and
  spring-elastically deformable elements positioned between the base walls of the battery modules and the underride guard panel.

6. The traction battery as claimed in claim 5, wherein
  a first section of the respective spring-elastically deformable element is connected to the base wall of at least one battery module and/or to at least one support of the battery frame, and
  second sections of the respective spring-elastically deformable element bear against the underride guard panel.

7. The traction battery as claimed in claim 6, wherein each spring-elastically deformable element is screw-connected to the base wall of the respective battery module and/or to the respective support of the battery frame by way of the first section of the spring-elastically deformable element.

8. A traction battery of a motor vehicle, said traction battery comprising:
  a battery frame,
  a plurality of battery modules which are accommodated in the battery frame and are each composed of a plurality of battery cells which are accommodated in a module housing,
  an underride guard panel which is connected to the battery frame, and
  spring-elastically deformable elements which are positioned between the module housings of the battery modules and the underride guard panel.

9. The traction battery as claimed in claim 8, wherein
  a first section of each spring-elastically deformable element is connected to the module housing of at least one battery module and/or to the battery frame, and
  second sections of each spring-elastically deformable element bear against the underride guard panel.

* * * * *